United States Patent
Kilic et al.

(10) Patent No.: US 11,815,870 B2
(45) Date of Patent: Nov. 14, 2023

(54) CARRYING OUT CALCULATION METHODS WITH A CONTROL UNIT OF A TRANSPORTATION VEHICLE

(71) Applicant: VOLKSWAGEN AKTIENGESELLSCHAFT, Wolfsburg (DE)

(72) Inventors: Mukayil Kilic, Berlin (DE); Thomas Christian Lesinski, Zeuthen (DE)

(73) Assignee: Volkswagen Aktiengesellschaft

( * ) Notice: Subject to any disclaimer, the term of this patent is extended or adjusted under 35 U.S.C. 154(b) by 795 days.

(21) Appl. No.: 16/589,673

(22) Filed: Oct. 1, 2019

(65) Prior Publication Data

US 2020/0110379 A1 Apr. 9, 2020

(30) Foreign Application Priority Data

Oct. 5, 2018 (DE) .................... 10 2018 124 636.6

(51) Int. Cl.
*G06F 9/50* (2006.01)
*G05B 19/042* (2006.01)
(Continued)

(52) U.S. Cl.
CPC ....... *G05B 19/0423* (2013.01); *G06F 9/5044* (2013.01); *H04L 9/00* (2013.01);
(Continued)

(58) Field of Classification Search
CPC .......................... G06F 9/5044; G06F 2209/503
See application file for complete search history.

(56) References Cited

U.S. PATENT DOCUMENTS

2010/0060484 A1* 3/2010 Peeters ................. G07B 15/02
340/928
2014/0163777 A1 6/2014 Yashiro et al.
(Continued)

FOREIGN PATENT DOCUMENTS

DE 10344008 A1 4/2005
DE 102012111316 A1 5/2014
(Continued)

OTHER PUBLICATIONS

Office Action; Chinese Patent Application No. 201910924528.0; dated Mar. 31, 2023.

*Primary Examiner* — Sisley N Kim
(74) *Attorney, Agent, or Firm* — BARNES & THORNBURG, LLP

(57) ABSTRACT

A method for performing computing procedures with a control unit of a transportation vehicle wherein the control unit is not installed in a fixed position in the transportation vehicle, but is instead a removable design. The control unit performs control tasks for transportation vehicle functions in the transportation vehicle and is used outside the transportation vehicle for vehicle-independent calculations. The control unit in the transportation vehicle uses a computing power and/or memory capacity which is/are not required for the control tasks for vehicle-independent calculations in the transportation vehicle, wherein these vehicle-independent calculations are continued outside the transportation vehicle when the control unit is removed from the transportation vehicle.

18 Claims, 1 Drawing Sheet

(51) Int. Cl.
*H04W 4/40* (2018.01)
*H04L 9/40* (2022.01)
*H04L 9/00* (2022.01)

(52) U.S. Cl.
CPC .............. *H04L 63/00* (2013.01); *H04W 4/40* (2018.02); *G05B 2219/25022* (2013.01); *G05B 2219/2637* (2013.01); *G05B 2219/2642* (2013.01); *G06F 2209/503* (2013.01)

(56) References Cited

U.S. PATENT DOCUMENTS

| | | | |
|---|---|---|---|
| 2014/0213238 A1 | 7/2014 | Giraud et al. | |
| 2018/0245561 A1* | 8/2018 | Perez | B60R 16/023 |
| 2019/0025856 A1* | 1/2019 | Turato | B60W 10/06 |
| 2019/0057217 A1* | 2/2019 | Link, II | H04L 67/12 |

FOREIGN PATENT DOCUMENTS

| | | |
|---|---|---|
| DE | 102014225593 A1 | 6/2016 |
| DE | 102016011071 A1 | 4/2017 |
| GB | 2345368 A | 7/2000 |
| WO | 2011026593 A1 | 3/2011 |

\* cited by examiner

CARRYING OUT CALCULATION METHODS WITH A CONTROL UNIT OF A TRANSPORTATION VEHICLE

PRIORITY CLAIM

This patent application claims priority to German Patent Application No. 10 2018 124 636.6, filed 5 Oct. 2018, the disclosure of which is incorporated herein by reference in its entirety.

SUMMARY

Illustrative embodiments relate to a method for performing computing procedures with a control unit of a transportation vehicle. Illustrative embodiments further relate to a mobile control unit to carry out the method, and a transportation vehicle which is configured to accommodate a mobile control unit of this type.

BRIEF DESCRIPTION OF THE DRAWINGS

Disclosed embodiments are described in more detail below with reference to the figures, in which.

DETAILED DESCRIPTION

Figure 1:
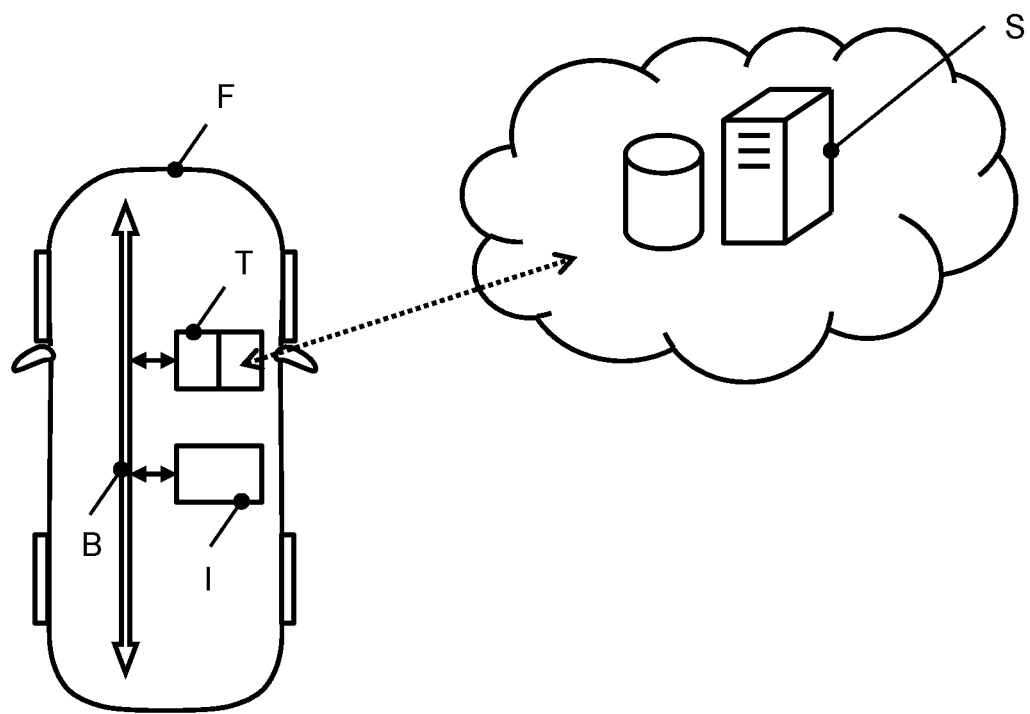
FIG. 1 shows schematically a transportation vehicle with a mobile control unit located in the transportation vehicle.

Present-day transportation vehicles have a multiplicity of control units. Even today, some of these control units represent independent, powerful computers, such as in an embedded system. Particularly in the case of control units for complex tasks, multiprocessor systems can be provided here, possibly with a graphical output system. Since the complexity of infotainment functions and telematic solutions continues to increase, it is currently assumed that control units in the transportation vehicle domain will have even higher computing power and greater memory capacities in future.

On the other hand, these extensive computer resources will frequently not be fully utilized in the transportation vehicle. High-resolution animated graphical outputs, for example, or comprehensive forecasts for the transportation vehicle environment based on real-time data may thus require a high computing power. However, in time periods in which a graphical output or forecast of this type is not performed, a large part of the available computer resources may remain unused.

DE 10 2014 225 593 A1 describes a facility for accessing this computing power which is not used in transportation vehicles. Here, a task to be performed by a computer is read into a computer inside the transportation vehicle, in particular, a control unit, wherein the task to be performed is provided by a server outside the transportation vehicle. A check is then carried out to determine whether the computer has sufficient computing capacity and the transportation vehicle has a sufficient electrical energy quantity to carry out the task which is to be performed. If so, the task is then carried out on the computer inside the transportation vehicle and the result is transmitted to the server outside the transportation vehicle. The mining, i.e., the generation, of Bitcoins can thus be performed, for example, by a transportation vehicle fleet through the use of algorithms for distributing computing power.

Disclosed embodiments provide an improved method for performing computing procedures with a control unit of a transportation vehicle.

In the disclosed method for performing computing procedures with a control unit of a transportation vehicle, the control unit is not installed in a fixed manner in the transportation vehicle, but is instead of mobile design, performs control tasks for transportation vehicle functions in the transportation vehicle and is used outside the transportation vehicle for vehicle-independent calculations.

A control unit of the transportation vehicle, such as, for example, a telematic control unit (TCU), can be used here for the calculation of vehicle-independent tasks. The facility exists to use the control unit both inside and outside the transportation vehicle, wherein the vehicle-independent calculations can also be performed for long time periods through the removal from the transportation vehicle without adversely affecting the energy reserves of the transportation vehicle. It can thus similarly be ensured that the control unit can remain protected during the calculation of sensitive data even if the transportation vehicle is unmanned or unattended, for example, by keeping the control unit in the residential or business premises of the transportation vehicle user. The results of the calculations can similarly be protected by taking along the control unit.

The control unit in the transportation vehicle uses a computing power and/or memory capacity which is/are not required for the control tasks for vehicle-independent calculations in the transportation vehicle, wherein these vehicle-independent calculations are continued outside the transportation vehicle when the control unit is removed from the transportation vehicle.

Complex calculations, such as, for example, mining in the case of cryptocurrencies such as Bitcoin, can also be continued in this way without interruption by removing the control unit from the transportation vehicle.

According to at least one disclosed embodiment, an identifier stored on a key of the transportation vehicle is evaluated to activate the vehicle-independent calculations. This ensures that the control unit can be used for vehicle-independent calculations only by users authorized for this purpose, and quickly and simply enables an authentication of the user and therefore a protection against unauthorized access to the vehicle-independent calculations.

According to a further disclosed embodiment, a key of the transportation vehicle is used to store and/or transfer the calculations performed outside the transportation vehicle and the preliminary results.

The storage of the task and the preliminary results on the key enables, for example, a simple transferability of the preliminary results to other control units. In this way, complex calculations can be started in a transportation vehicle and can be continued or completed in a different transportation vehicle, for example, in the case of a plurality of transportation vehicles in the private ownership of the user, in the communal use of transportation vehicles on the basis of a car-sharing agreement or the use of different transportation vehicles of a transportation vehicle rental company.

One control unit together with one or more further control units forms a network here.

In this way, particularly in the case of tasks with computing-intensive calculations, a division into subtasks can be performed, wherein the subtasks can then be fed in each case to individual control units of the network and can be processed by the individual control units.

The results of the performed calculations can be stored in a plurality of control units forming the network.

The local storage then enables a high security against loss of the data, even without central data backup.

The results may be stored here in the control units participating in the network in a data structure consisting of blocks, wherein the blocks are concatenated with one another, whereby each block contains a cryptographic checksum of the preceding block.

A data structure of this type enables a high data security against corruption of the data for a local storage without a coordinating central unit.

It can furthermore be beneficial if one of a plurality of different power stages can be chosen by a user of the transportation vehicle for the use of the computing power.

As a result, the user of the transportation vehicle can, on the one hand, specify the amount of computing resources he currently wishes to make available for tasks outside the transportation vehicle and can thus also define, for example, the energy consumption through the performance of the calculations which is acceptable to him. On the other hand, this also enables the duration of the calculations to be more accurately predicted.

The control unit may be designed here to capture, process and store telematic data and/or transmit the data to a server outside the transportation vehicle.

The disclosed embodiments also relate to a mobile control unit which is configured to carry out a method of this type, and a transportation vehicle which is configured to accommodate a mobile control unit of this type.

Disclosed embodiments will be explained in more detail below with reference to the figures to provide a clearer understanding of the principles of the present disclosure. The disclosure is obviously not limited to these embodiments, and the described features can also be combined or modified without departing the protective scope of the disclosure.

FIG. 1 shows schematically a transportation vehicle F which has a powerful control unit, such as a telematic control unit T. The shown position of the telematic control unit T in the transportation vehicle is not intended here to indicate, e.g., the installation location, which may instead essentially be located at any position in the transportation vehicle. However, since the facility is intended to exist for the telematic control unit T to be operated by the user outside the transportation vehicle also, the telematic control unit is disposed so that it can be readily accessed and easily removed by the user. For this purpose, the telematic control unit T can be designed, for example, as a plug-in module. Electrical plug-in connections can be provided for the connection to the on-board power supply system of the transportation vehicle.

The telematic control unit T is connected to at least one digital data bus B in the transportation vehicle, for example, a CAN bus, which enables an exchange of data with other electronic components of the transportation vehicle. Similarly, however, a plurality of CAN buses with different transmission rates and/or different line-connected networks can also be connected to the telematic control unit T. Communication interfaces for a wireless connection to other transportation vehicle components or other electronic devices in the transportation vehicle, such as mobile radio devices, or correspondingly equipped electronic devices in the transportation vehicle environment can furthermore also be provided. The wireless communication can be performed, for example, by WLAN or BLUETOOTH®.

An infotainment unit I is shown in FIG. 1 as an example of a further transportation vehicle component. However, a multiplicity of further electronic components not shown here, such as various sensors for monitoring transportation vehicle parameters or parameters for the transportation vehicle environment, actuators, displays, operating units or further control units, are normally also connected to the data bus B in a present-day transportation vehicle.

Along with a computing unit, such as, for example, a microprocessor or an FPGA with one or more CPU cores, possibly with an integrated ARM processor, one or more electronic memories and interfaces for the bus communication, the telematic control unit T also has a communication unit (not shown), such as, for example, a mobile radio modem. Data can be exchanged with the server S outside the transportation vehicle by this communication unit via a wireless connection. A high level of data protection can be ensured here using a TPM (Trusted Platform Module) chip. The telematic control unit T can furthermore comprise an integrated GPS module with which location coordinates of the transportation vehicle are continuously measured.

Depending on the available data, a multiplicity of different telematic-based functions can be implemented. Thus, an alternative route can be proposed in the event of traffic congestion, an emergency number can be called automatically in the event of an accident, or Internet-based searching can also be carried out or information can be output.

Particularly if the telematic control unit T is equipped with a high computing power which is not required in its entirety for the telematic-based functions, for example, because not all of these functions are activated for the transportation vehicle, a part of this computing power can already be used in the transportation vehicle for vehicle-independent calculations, as is intended to be indicated by the subdivision of the telematic control unit T in FIG. 1. A vehicle-independent calculation can similarly be carried out for time periods in which the telematic-based functions require no appreciable computing power. Complex computing operations for cryptocurrencies, such as the mining of Bitcoins, for example, can thus be carried out using the surplus computing power. The surplus computing power can similarly be used for a cryptocurrency-based loyalty program which is based on the consideration of information inside the transportation vehicle, such as speed, fuel consumption, braking behavior.

Power stages for the use of the computing power can also be defined. Thus, for example, 20%, 40%, 60% or 80% of the available computing power can be freely chosen by the user for the vehicle-independent calculations. A residual buffer of, for example, 20% of the computing power can furthermore be defined to guarantee that the ongoing transportation vehicle functions can continue to be carried out error-free.

Figure 2:
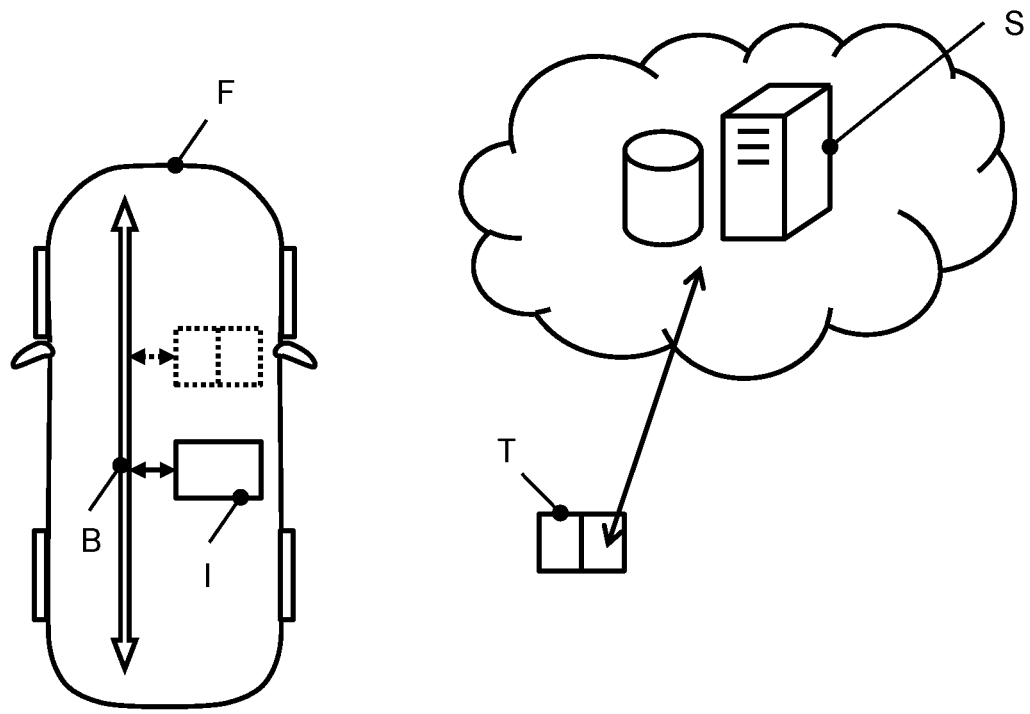
FIG. 2 shows the transportation vehicle from FIG. 1 with a mobile control unit removed from the transportation vehicle.

According to the disclosed embodiments, the telematic control unit T is of mobile design and, as shown in FIG. 2, can be removed from the transportation vehicle F and can then be used outside the transportation vehicle for vehicle-independent calculations. Since control tasks for functions of the transportation vehicle F are then no longer performed, the entire computing power of the telematic control unit T is now available for this purpose. The power supply can be guaranteed by a battery storage device integrated into the telematic control unit T or, particularly for longer calculations, by a mains voltage operation.

It can also be provided here for vehicle-independent calculations which have already been started by surplus computing power in the transportation vehicle to be continued outside the transportation vehicle when the control unit has been removed from the transportation vehicle. Computing results, particularly if they reflect a particular notional or monetary value, can be secured or also transferred to different electronic devices through the removal.

The telematic control unit T can furthermore be integrated into an in-house network. In this case also, the communication with the server S takes place directly via the communication unit of the telematic control unit T and not, for example, via an Internet connection of the home network. The telematic control unit can also be used as a central router in the home network to integrate domestic appliances, for example, via WLAN, into a secured network and control the communication via the telematic control unit. The entire communication between the transportation vehicle, server and a home network can be based here on a CA Root Server with certificate encryption (TLS) to guarantee a high security standard and protection against cyber-attacks.

It can also be provided that the key of the transportation vehicle communicates wirelessly with the telematic control unit T and is used as an additional mobile buffer memory, authentication and/or activation medium. An authentication of the user can take place not only inside the transportation vehicle, but also outside the transportation vehicle by the unique ID of the key.

A transfer of the computing task and a storage of the preliminary or final results can furthermore be performed by the key of the transportation vehicle. For this purpose, these data can be transmitted by the telematic control unit T at regular time intervals onto a data memory present in the key, for example, by a WLAN or BLUETOOTH® transmission. If personal data are also included in the calculations, it can also be provided to link the data to be stored with a user profile stored on the key.

In the same way as the storage is performed, the computing task and the preliminary or final results can also be read from the key and can be transmitted, for example, onto a different telematic control unit without an interim data transmission onto the server outside the transportation vehicle having to be performed. In addition, the transportation vehicle status or specific transportation vehicle information can also be stored on the key to retain these data if the connection between the server and the telematic control unit has failed.

Finally, a redundant storage is possible not only in the memory of the telematic control unit T but also in the data memory of the key to increase security in respect of memory problems.

It can furthermore be provided to set up a network consisting of a plurality of telematic control units which communicate wirelessly with one another, for example, via direct communication paths such as BLUETOOTH® or WLAN, and indirectly via a mobile radiocommunication network. Here, the telematic control units can set up a peer-to-peer network, wherein different protocols can be used to document the results in the network, for example, by a cryptographic concatenation in a locally managed accounting system according to the blockchain technology.

It is irrelevant here whether the control units participating in the network are located in each case in the transportation vehicle or whether some or all of the control units are operated outside the transportation vehicle for the computing task. Similarly, instead of a plurality of control units of different transportation vehicles, a plurality of control unit of the same transportation vehicle can form a network if this transportation vehicle is equipped with a plurality of powerful control units.

The disclosed embodiments can be used in any domains of transportation vehicle technology.

REFERENCE NUMBER LIST

F Transportation vehicle
T Telematic control unit
B Digital data bus
I Infotainment unit
S Server outside the transportation vehicle

The invention claimed is:

1. Mobile telematics control equipment for a transportation vehicle, the equipment comprising:
 a mobile telematics control unit configured so as to be removable from the transportation vehicle, wherein the mobile telematics control unit includes a computing unit being configured for performing:
  telematics functions in the transportation vehicle while the mobile telematics control unit is positioned inside the transportation vehicle; and
  vehicle-independent calculations while the mobile telematics control unit is positioned outside the transportation vehicle; and
 a key for the transportation vehicle, wherein the key includes an identifier stored thereon, whereon the identifier is evaluated during activation of the vehicle-independent calculations,
 wherein the transportation vehicle key is used to store and transfer the calculations performed outside the transportation vehicle and preliminary results of the calculations.

2. The mobile telematics control equipment of claim 1, wherein the mobile telematics control unit uses computing power and/or memory capacity which is/are not required for control tasks for vehicle-independent calculations while in the transportation vehicle and these control tasks for vehicle-independent calculations are continued outside the transportation vehicle as a result of the mobile telematics control unit being removed from the transportation vehicle.

3. The mobile telematics control equipment of claim 2, wherein one of a plurality of different power stages is chosen by a user of the transportation vehicle for the use of the computing power.

4. The mobile telematics control equipment of claim 1, wherein the mobile telematics control unit, together with one or more further control units, forms a network.

5. The mobile telematics control equipment of claim 4, wherein results of the performed calculations are stored in a plurality of control units forming the network.

6. The mobile telematics control equipment of claim 5, wherein the results are stored in the control units participating in the network in a data structure including blocks, wherein the blocks are concatenated with one another, whereby each block contains a cryptographic checksum of a preceding block.

7. A transportation vehicle comprising:
 mobile telematics control equipment, the transportation vehicle being configured to accommodate a mobile telematics control unit therein, wherein the mobile telematics control unit is configured so as to be removable from the transportation vehicle,
 wherein the mobile telematics control unit includes a computing unit being configured to perform telematics functions while the mobile telematics control unit is positioned inside the transportation vehicle, wherein the computing unit is configured to perform vehicle-independent calculations while the mobile telematics control unit is positioned outside the transportation vehicle, wherein the mobile telematics control equipment also includes a key for the transportation vehicle, wherein the key includes an identifier stored thereon, whereon the identifier is evaluated during activation of the vehicle-independent calculations, and wherein the transportation vehicle key is used to store and transfer the calculations performed outside the transportation vehicle and preliminary results of the calculations.

8. The transportation vehicle of claim 7, wherein the mobile telematics control unit uses computing power and/or memory capacity which is/are not required for control tasks for vehicle-independent calculations while in the transportation vehicle and these control tasks for vehicle-independent calculations are continued outside the transportation vehicle as a result of the mobile telematics control unit being removed from the transportation vehicle.

9. The transportation vehicle of claim 8, wherein one of a plurality of different power stages is chosen by a user of the transportation vehicle for the use of the computing power.

10. The transportation vehicle of claim 7, wherein the mobile telematics control unit, together with one or more further control units, forms a network.

11. The transportation vehicle of claim 10, wherein results of the performed calculations are stored in a plurality of control units forming the network.

12. The transportation vehicle of claim 11, wherein the results are stored in the control units participating in the network in a data structure including blocks, wherein the blocks are concatenated with one another, whereby each block contains a cryptographic checksum of a preceding block.

13. A method for performing computing procedures by mobile telematics control equipment including a mobile telematics control unit for a transportation vehicle, wherein the mobile telematics control unit is removable from the transportation vehicle, the method comprising:

performing telematics functions in the transportation vehicle while the mobile telematics control unit is positioned inside the transportation vehicle; and performing vehicle-independent calculations while the mobile telematics control unit is positioned outside the transportation vehicle, wherein the mobile telematics control equipment also includes a key for the transportation vehicle, wherein the key includes an identifier stored thereon, whereon the method further comprises evaluating the identifier during activation of the vehicle-independent calculations, storing the calculations performed outside the transportation vehicle and preliminary results of the calculations on the key, and transferring the calculations performed outside the transportation vehicle and preliminary results of the calculations using the key.

14. The method of claim 13, wherein the mobile telematics control unit uses computing power and/or memory capacity which is/are not required for control tasks for vehicle-independent calculations while in the transportation vehicle and these control tasks for vehicle-independent calculations are continued outside the transportation vehicle as a result of the mobile telematics control unit being removed from the transportation vehicle.

15. The method of claim 14, wherein one of a plurality of different power stages is chosen by a user of the transportation vehicle for the use of the computing power.

16. The method of claim 13, wherein the mobile telematics control unit, together with one or more further control units, forms a network.

17. The method of claim 16, wherein results of the performed calculations are stored in a plurality of control units forming the network.

18. The method of claim 17, wherein the results are stored in the control units participating in the network in a data structure including blocks, wherein the blocks are concatenated with one another, whereby each block contains a cryptographic checksum of a preceding block.

* * * * *